US008472603B2

(12) United States Patent (10) Patent No.: US 8,472,603 B2
Fusco et al. (45) Date of Patent: Jun. 25, 2013

(54) REMOTE MONITORING OF PHONE CALLS

(75) Inventors: Antonio Fusco, Turin (IT); Giannunzio Fettarappa, Turin (IT); Emanuele Sargentini, Turin (IT)

(73) Assignee: Telecom Italia S.p.A., Milan (IT)

( * ) Notice: Subject to any disclaimer, the term of this patent is extended or adjusted under 35 U.S.C. 154(b) by 881 days.

(21) Appl. No.: 12/311,072

(22) PCT Filed: Sep. 19, 2006

(86) PCT No.: PCT/EP2006/009071
§ 371 (c)(1),
(2), (4) Date: Nov. 3, 2009

(87) PCT Pub. No.: WO2008/034450
PCT Pub. Date: Mar. 27, 2008

(65) Prior Publication Data
US 2010/0111282 A1 May 6, 2010

(51) Int. Cl.
*H04M 3/42* (2006.01)
(52) U.S. Cl.
USPC .................................. 379/211.02; 379/88.19
(58) Field of Classification Search
USPC .................................. 379/211.02, 352, 88.19
See application file for complete search history.

(56) References Cited

U.S. PATENT DOCUMENTS

| | | | |
|---|---|---|---|
| 7,542,462 B1* | 6/2009 | Murphy ........................ | 370/352 |
| 7,711,810 B2* | 5/2010 | McKinnon et al. ............ | 709/224 |
| 2002/0075305 A1* | 6/2002 | Beaton et al. .................. | 345/751 |
| 2004/0133641 A1 | 7/2004 | McKinnon et al. | |
| 2006/0117264 A1 | 6/2006 | Beaton et al. | |
| 2007/0047531 A1* | 3/2007 | Malhotra et al. ............... | 370/356 |

FOREIGN PATENT DOCUMENTS

| | | |
|---|---|---|
| EP | 1 435 722 A2 | 7/2004 |
| WO | WO-2005/109844 A2 | 11/2005 |

OTHER PUBLICATIONS

Roach, "Session Initiation Protocol (SIP)—Specific Event Notification", Network Working Group, Request for Comments: 3265, The Internet Society, pp. 1-34, (2002).
Niemi, "Session Initiation Protocol (SIP) Extension for Event State Publication", Network Working Group, Request for Comments: 3903, The Internet Society, pp. 1-29, (2004).
Worley et al., "Call Pickup Examples I SIP", Sipping, The Internet Society, pp. 1-30, (2006).

(Continued)

*Primary Examiner* — Amal Zenati
(74) *Attorney, Agent, or Firm* — Finnegan, Henderson, Farabow, Garrett & Dunner, L.L.P.

(57) ABSTRACT

A communication system includes a plurality of endpoints associated with predetermined groups of endpoints; a server adapted to store for each group of endpoints a list of the endpoints, among the plurality of endpoints, associated therewith; and a communication network adapted to allow the server and the plurality of endpoints to communicate with each other, wherein, for an incoming phone call from a calling endpoint, each endpoint of the plurality of endpoints includes modules adapted to: 1) receive from the calling endpoint a request to establish the incoming phone call; 2) send a message to the server reporting about the incoming phone call from the calling endpoint, and wherein the server includes modules adapted to: a) receive the message sent in 2); b) identify, based on the received message, a group of endpoints associated with the endpoint sending the message in 2); c) identify at least one monitoring endpoint associated with the group of endpoints identified in b); and d) send to the at least one monitoring endpoint identified in c) a message notifying of the incoming phone call.

8 Claims, 5 Drawing Sheets

OTHER PUBLICATIONS

Lonnfors et al., "Session Initiation Protocol (SIP) Extension for Partial Notification of Presence Information", Simple WG, The Internet Society, pp. 1-15, (2006).

Mahy et al., "Remote Call Control in the Session Initiation Procotol (SIP) Using the Refer Method and the Session-Oriented Dialog Package", SIP WG, The Internet Society, pp. 1-14, (2006).

* cited by examiner

REMOTE MONITORING OF PHONE CALLS

CROSS REFERENCE TO RELATED APPLICATION

This application is a national phase application based on PCT/EP2006/009071, filed Sep. 19, 2006, the content of which is incorporated herein by reference.

BACKGROUND OF THE INVENTION

1. Field of the Invention

The present invention relates to remote monitoring of phone calls.

2. Description of the Related Art

Methods for managing incoming phone calls are known in the art.

For example, EP 1 435 722 relates to distributed communication services based on a presence technology platform. In particular, EP 1 435 722 discloses an implementation of a multiple appearance directory number (MADN) service where multiple telephone are rung, one is answered, the call is held, another telephone requests the cell, and the call is handed to the requesting telephone. The session initiation protocol (SIP) is used for the exchange of state information and the presentation of sessions or calls.

As stated by EP 1 435 722, in general, SIP is used to facilitate media sessions between any number of endpoints, which represent the devices communicating with each other, directly or indirectly via a SIP proxy. These endpoints may support any one or combination of data, audio, and voice media sessions, depending on the configuration of the respective endpoints.

A SIP endpoint is generally capable of running an application, which is generally referred to as a user agent (UA), and is capable of facilitating media sessions using SIP. User agents register their ability to establish sessions with a SIP proxy, such as a proxy server, by sending "REGISTER" messages to the SIP proxy. The REGISTER message informs the SIP proxy of the SIP universal resource locator (URL) that identifies the user agent to the SIP network. The REGISTER message also contains information about how to reach specific user agents over the SIP network, by providing the Internet Protocol (IP) address and port that the user agent will use for SIP sessions. A "SUBSCRIBE" message may be used to subscribe to an application or service provided by a SIP endpoint. Further, "NOTIFY" messages may be used to provide information between SIP endpoints in response to various actions or messages, including REGISTER and SUBSCRIBE messages.

When a user agent wants to establish a session with another user agent, the user agent initiating the session will send an INVITE message to the SIP proxy and specify the targeted user agent in the TO header of the INVITE message. Identification of the user agent takes the form of a SIP URL. In its simplest form, the URL is represented by a number or "<username>@<domain>". The SIP proxy will use the SIP URL in the TO header of the message to determine if the targeted user agent is registered with the SIP proxy. Generally, the user name is unique within the name space of the specified domain. If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

In an example illustrated by EP 1 435 722, three endpoints are considered, which are telephones 1-3. Each participant device (telephones 1-3) is associated with a presentity, which watches all of its peers and informs all of its peers of significant service-related changes.

In this environment, initially, presentities P1, P2, and P3 associated with telephones 1-3, register the need to receive updates with each other. As such, presentity P1 for TELEPHONE 1 sends SUBSCRIBE messages to presentity P2 for TELEPHONE 2 and presentity P3 for TELEPHONE 3; presentity P2 for TELEPHONE 2 sends SUBSCRIBE messages to presentity P1 for TELEPHONE 1 and presentity P3 for TELEPHONE 3; and presentity P3 for TELEPHONE 3 sends SUBSCRIBE messages to presentity P2 for TELEPHONE 2 and presentity P1 for TELEPHONE 1 (steps 308 and 310). At this point, each presentity (P1-P3) for each telephone (1-3) is configured to notify the others of changes in state. Each of the telephones 1-3 is configured to simultaneously ring in response to an incoming call to a defined directory number or address. A proxy server recognizes an incoming call to telephones 1-3 and sends an INVITE message to each of the telephones 1-3 to initiate a media session. Any of the INVITE messages may be responded to with a 200 OK message.

In the example, TELEPHONE 2 is answered. As such, TELEPHONE 2 sends an OK message in response to the INVITE message to the proxy server 24, and presentity P2 sends NOTIFY messages to presentities P3 and P1 indicating that it was answered. Then, it is assumed that after establishment of a media session with TELEPHONE 2, the media session is placed on hold by the user of TELEPHONE 2. In response, TELEPHONE 2 sends an INVITE message placing the call on hold to the proxy server 24, which forwards the hold message on to the device originating the media session in a direct or indirect fashion. Presentity P2 then sends NOTIFY messages to presentities P1 and P3 indicating that TELEPHONE 2 has placed the media session on hold.

Assuming that the held session is taken over by TELEPHONE 3 in response to a call request, presentity P3 sends a NOTIFY message including a request to take over the call to presentity P2 and send a NOTIFY message indicating the same to presentity P1. In response, TELEPHONE 2 refers the session to TELEPHONE 3 by sending a REFER message to the originator of the call via the proxy server 24, whereupon the originator of the call will respond by sending an INVITE message configured to establish the media session with TELEPHONE 3 via the proxy server 24. Presentity P3 will then notify presentities P1 and P2 of the state change.

The Applicant notes that according to the above distributed service, each participating device has to subscribe to notification services for all the participating devices of interest. In particular, each participating device has to send a SUBSCRIBE message (and subsequently a NOTIFY message) to all the participating devices of its interest. This implies that a high number ($n*(n-1)$) of SUBSCRIBE (and subsequent NOTIFY) messages are exchanged among the n participating devices interacting with each other. Thus, the number of exchanged messages quadratically increases as the number n of participating devices increases.

Moreover, the Applicant notes that in the service disclosed by EP 1 435 722 each of a group of telephones is configured to simultaneously ring in response to an incoming call to a defined directory number or address. A proxy server recognizes an incoming call to the group of telephones and sends an INVITE message to each of the group of telephones to initiate a media session. This implies that, when the telephones of the group belong to different users (for example, in an office situation), a user wishing to call any of said users has the possibility to call all of them at once, by making only one phone call to the directory number or address of the group. However, the service disclosed by EP 1 435 722 is not practical when the group of telephones is associated with a same USER-A so that all of the telephones of the group of USER-A simultaneously ring in response to an incoming phone call to the directory number or address of the group. In fact, according to this service, USER-A is required to spread, besides the phone number of each telephone, an additional number (i.e., the directory number or address of the group) to all the acquaintances of his interest. Moreover, USER-B, wishing to call USER-A, is required to know and note down, besides the phone number of each telephone of USER-A, also the directory number or address of the group associated with USER-A, and to remember, at the time of making the phone call, to dial the group of USER-A and not a specific telephone thereof. Therefore, the good functioning of the service is in the user's hands.

WO 2005/109844 relates to call pick up group (CPG) functionality which enables a user in a CPG to answer a phone call received at a phone number of the CPG that is different from a phone number of that user.

In particular, WO 2005/109844 discloses a communication network comprising a plurality of endpoints and a call control unit. When an incoming phone call is presented to a CPG for pickup, the call control unit is adapted to access call data associated with the CPG and communicate that data to one or more users in the CPG. Call data associated with a CPG may include data identifying one or more users in the CPG, data indicating whether one or more users in the CPG are available, data indicating a current presence status of each one or more users in the CPG, data indicating a current call status of each of one or more users in the CPG, data indicating a willingness of each of one or more users in the CPG to pick up an incoming phone call, other data, or a combination of such data.

In particular embodiments, when communication network receives an incoming phone call to a phone number corresponding to a CPG, communication network identifies one or more endpoints that one or more users in the CPG are currently present at. Communication network then routes the incoming phone call to endpoints to present the incoming phone call to those users for pickup. Any one of those users may then pick up the incoming phone call.

In particular embodiments, according to CPG functionality, when communication network receives an incoming phone call to a phone number corresponding to a CPG, communication network does not present the incoming phone call to all users in the CPG for pickup, but may nonetheless communicate data to all users in the CPG. For example, when an incoming phone call is presented to a CPG for pickup, call control unit may access call data indicating a current call status of each user in the CPG and communicate that data to one or more users in the CPG for display. That data may inform a user in the CPG who is considering whether to pick up the incoming phone call how many other users in the CPG are currently on other phone calls. That data may also inform a user in the CPG who is considering whether to pick up the incoming phone call how many other users in the CPG are not currently on other phone calls and are therefore available to pick up the incoming phone call. If no other users in the CPG are available to pick up the incoming phone call, the user in the CPG who is considering whether to pick up the incoming phone call may pick up the incoming phone call in response to no other users in the CPG being available to pick up the incoming phone call.

Applicant notes that in the service disclosed by WO 2005/109844, the communication network receives an incoming phone call to a phone number corresponding to a CPG and then routes the incoming phone call to all or some of the endpoints associated with said CPG. Analogously to EP 1 435 722, this implies that when the endpoints of the CPG belong to different users (as shown in FIG. 2 of WO 2005/109844), a user wishing to call any of said users has the possibility to call all of them at once, by making only one phone call to the number of the group. However, the service disclosed by WO 2005/109844 is not practical when CPG is associated with a same USER-A so that all of the endpoints of the group of USER-A simultaneously ring in response to an incoming phone call to the number of the group. In fact, according to this service, USER-A is required to spread, besides the phone number of each endpoint, an additional number (i.e., the number of the group) to all the acquaintances of his interest. Moreover, USER-B, wishing to call USER-A, is required to know and note down, besides the number of each telephone of USER-A, also the number of the CPG associated with USER-A, and to remember, at the time of making the phone call, to dial the group of USER-A and not a specific endpoint thereof. Therefore, the good functioning of the service is in the user's hands.

Draft-mahy-sip-remote-cc-02.txt, SIP WG; Internet-Draft; R. Mahy (SIP Edge LLC) and C. Jennings (Cisco Systems), Oct. 23, 2005; relates to "Remote Call Control in SIP using the REFER method and the session-oriented dialog package".

As stated in this draft, while the SIP core protocol describes how user agents originate and terminate sessions, remote call control is the manipulation of conversation, dialogs, or sessions. This manipulation involves sending REFER requests to a user agent (UA) which is directly involved, using information obtained via the dialog package. The REFER method is used to implement call transfer and, in general, to ask another UA to do something on your behalf. For example, using remote control, a computer or organizer could cause a nearby phone to dial from numbers or URIs in a document, email, or address book; allow users to answer or deflect incoming calls without removing hands from the computer keyboard; place calls on hold; and join other sessions on the phone or otherwise.

In the example on page 5 of this draft, in the requests labeled with 1 and 2, Alice's PC or PDA sets up a subscription to the dialog package from Alice's phone. All of the subsequent NOTIFY messages are notifications about changes in the dialog state at Alice's phone. Message 8 is an invitation received by Alice's phone from Cathy. With REFER messages 9, 10, and 11 Alice's PC or PDA would cause Alice's phone to redirect, reject, or accept the invitation.

The Applicant notes that according to the remote call control disclosed by this draft, each Refer-Issuer (the user agent issuing the REFER request) has to set up a subscription to the dialog package from all the REFER-Recipients (user agents receiving the REFER request) of its interest. In particular, each Refer-Issuer has to send a SUBSCRIBE message to each REFER-Recipient of its interest, in order to be enabled to manipulate it. This implies a high number (n*(n−1)) of sent SUBSCRIBE messages when the number n of devices involved is high.

Moreover, the Applicant notes that, in the remote call control disclosed by this draft, any Refer-Issuer device, unless a proper authorization policy is provided, can set up a subscription with a REFER-Recipient to manipulate it. Thus, in order to avoid fraudulent manipulations, each REFER-Recipient should be suitably configured in order to be enabled to accept SUBSCRIBE messages only from predetermined "authorized" Refer-Issuer device(s). However, this would require the user to take upon himself the burden of configuring each REFER-Recipient device and keeping said configuration updated. Moreover, it would require high performance REFER-Recipient devices, capable to act as server devices to manage incoming SUBSCRIBE requests by REFER-Recipient devices and to authorize only the authorized Refer-Issuer device(s). The workload required to these REFER-Recipient devices increases as the number of SUBSCRIBE messages to be handled increases.

Furthermore, in the remote call control disclosed by this draft, the user devices are enabled to exploit communication network resources without giving any possibility to the communication network to control it. This may be disadvantageous in term of reliability and fraud issues.

The Applicant faced the technical problem of providing a method for managing incoming phone calls which allows overcoming the above mentioned disadvantages of the prior art.

SUMMARY OF THE INVENTION

The Applicant has devised a solution to this problem which, in various aspects thereof, enables a user to be informed about phone calls directed to endpoints being part of a group and, preferably, to redirect, from any endpoint of the group, the incoming phone call to any other endpoint of the group. The solution is particularly advantageous when the group of endpoints is associated with a same user.

In a first aspect, the present invention relates to a method for managing, in a server of a communication system, an incoming phone call from a calling endpoint to a called endpoint associated with a group of endpoints, said group comprising the called endpoint and at least one monitoring endpoint, the method comprising:
   a) receiving a message from the called endpoint reporting about the incoming phone call from the calling endpoint to the called endpoint;
   b) identifying said group of endpoints associated with the called endpoint based on said message;
   c) identifying the at least one monitoring endpoint associated with the group of endpoints identified in step b);
   d) sending to the at least one monitoring endpoint identified in step c) a message notifying the incoming phone call from the calling endpoint to the called endpoint.

In the present description and claims, the term "server" is used to indicate network equipment comprising hardware, software and/or firmware means adapted to provide predetermined services to other equipments (in the art usually referred to as "clients"). In particular, for the purposes of the present invention, a server indicates network equipment supporting a high number of transactions (including possible processing of information) per unit time (typically several tens, or even hundreds of transactions/s) for the purpose of providing services to a high number of clients.

Advantageously, the group of endpoints is identified by a group identifier. Advantageously, each endpoint is identified by an endpoint identifier.

Typically, the method comprises a1) obtaining the called endpoint identifier. Typically, the called endpoint identifier is obtained from the message received in step a).

Typically, step b) comprises obtaining the identifier of said group. According to a variant, said group identifier is retrieved from the message received in step a). According to another variant, said group identifier is retrieved from a suitable database by using the called endpoint identifier obtained in a1).

Typically, by using the group identifier obtained in step b), step c) is performed by retrieving from said database the at least one monitoring endpoint associated with said group identifier.

According to an embodiment, the method further comprises e) receiving from one of the monitoring endpoints of the group a message requesting to redirect the incoming phone call, said message comprising an identifier of a monitoring endpoint of the group towards which redirecting the incoming phone call. Said identifier may be the identifier of the same monitoring endpoint sending the request to redirect the incoming phone call or of another monitoring endpoint of the group.

According to this embodiment, the method advantageously further comprises e1) sending to the called endpoint a message notifying the request to redirect the incoming phone call, said message comprising the identifier of the monitoring endpoint towards which redirecting the incoming phone call.

Typically, the method further comprises sending the message of e1) also to the at least one monitoring endpoint.

According to this embodiment, the method advantageously further comprises e2) receiving from the called endpoint a message reporting that the calling endpoint has been requested to redirect the incoming phone call.

According to this embodiment, the method advantageously further comprises e3) sending to the at least one monitoring endpoint a message notifying that the calling endpoint has been requested to redirect the incoming phone call.

Preferably, the method also comprises receiving from at least one of the endpoints of the group a message for setting up a subscription to receive information about the endpoints of the group.

Advantageously, said message is received before executing steps a) to d).

In this case, advantageously, the method further comprises checking whether said at least one of the endpoints of the group is authorized, according to a predetermined authorization policy, to set up said subscription.

For example, it is checked whether said at least one of the endpoints of the group is associated with said group in a suitable database.

In the affirmative case, the method advantageously comprises sending to said at least one of the endpoints of the group a message notifying the positive result of the check.

In the affirmative case, the method advantageously comprises memorizing the positive result of the subscription set up by said at least one of the endpoints of the group in said database.

In the negative case, the method advantageously comprises sending to said at least one of the endpoints of the group a message notifying the negative result of the check.

Advantageously, step d) of sending to the at least one monitoring endpoint a message notifying the incoming phone call is performed if the at least one monitoring endpoint has successfully set up said subscription.

Advantageously, step e1) of sending to the called endpoint a message notifying the request to redirect the incoming phone call is performed if the called endpoint has successfully set up said subscription.

Advantageously, step e3) of sending to the at least one monitoring endpoint a message notifying that the calling endpoint has been requested to redirect the incoming phone call is performed if the at least one monitoring endpoint has successfully set up said subscription.

According to a preferred embodiment of the invention, messages are exchanged according to the session initiation protocol (SIP), the SIP extension for Specific Event Notification RFC3265 and the SIP extension for Event State Publication RFC3903.

For example, message in a) advantageously is a SIP PUBLISH message. Message in d) advantageously is a SIP NOTIFY message. Message in e) advantageously is a SIP PUBLISH message. Message in e1) advantageously is a SIP NOTIFY message. Message in e2) advantageously is a SIP PUBLISH message. Message in e3) advantageously is a SIP NOTIFY message.

In a second aspect, the present invention relates to a method for operating an endpoint associated with a group of endpoints, the association being established at a server of a communication system wherein, for an incoming phone call from a calling endpoint, the method comprises:
1) receiving from the calling endpoint a request to establish the incoming phone call; and
2) sending a message to the server reporting about the incoming phone call from the calling endpoint.

Typically, the method further comprises 3) informing the calling endpoint about the receipt of said request.

According to a preferred embodiment, the method comprises 4) sending a message to the server for requesting to set up a subscription to receive information about the endpoints associated with the group of endpoints.

Typically, 4) is performed (automatically or by a user request) at the switching on of the endpoint.

In this case, the method advantageously further comprises receiving from the server a message indicating that the request of subscription came to a successful result.

The method advantageously further comprises 5) receiving a message from the server notifying a request to redirect the incoming phone call to another endpoint of the group. Advantageously 5) is performed if the request of subscription came to a successful result.

Advantageously, the message in 5) comprises an identifier of an endpoint of the group which made the request to redirect the incoming phone call.

Advantageously, the method further comprises 6) requesting the calling endpoint to redirect the incoming phone call towards said another endpoint of the group.

Advantageously, the method further comprises 7) sending to the server a message reporting that the calling endpoint has been requested to redirect the incoming phone call towards said another endpoint of the group.

Advantageously, the method further comprises 8) receiving from the server a message notifying that the incoming phone call has been successfully redirected to said another endpoint of the group.

When the phone call is placed from the calling endpoint to another endpoint of the group, the method advantageously comprises 9) receiving a message from the server notifying said phone call.

Advantageously, 9) is performed if the above mentioned request for subscription came to a successful result.

In the method, 9) advantageously further comprises informing, through a suitable user interface, a user of the endpoint about said phone call placed from the calling endpoint to another endpoint of the group.

The user interface may be, for example, a graphical user interface.

Advantageously, the method further comprises 10) sending a message to the server requesting to redirect the phone call, said message comprising an identifier of an endpoint of the group towards which redirecting the phone call.

The identifier in 10) may be the identifier of the same endpoint sending the message or of another endpoint of the group. This allows redirecting the phone call to the same endpoint making the request for redirection or to another endpoint of the group.

The method advantageously further comprises 11) receiving from the server a message notifying that the calling endpoint has been requested to redirect the phone call.

According to a preferred embodiment of the invention, messages are exchanged according to the session initiation protocol (SIP), the SIP extension for Specific Event Notification RFC3265 and the SIP extension for Event State Publication RFC3903.

For example, message in 3) advantageously is a SIP PUBLISH message. Message in 5) advantageously is a SIP NOTIFY message. Message in 7) advantageously is a SIP PUBLISH message. Message in 8) advantageously is a SIP NOTIFY message. Message in 9) advantageously is a SIP NOTIFY message. Message in 10) advantageously is a SIP PUBLISH message. Message in 11) advantageously is a SIP NOTIFY message.

In a third aspect, the present invention relates to a method for managing, in a server of a communication system and in a monitoring endpoint, a phone call placed from a calling endpoint to a called endpoint, the called endpoint and the monitoring endpoint being associated with a group of endpoints, the association being established at the server, the method comprising:
i. at the monitoring endpoint, receiving a message from the server notifying the phone call placed from the calling endpoint to the called endpoint; and sending a message to the server requesting to redirect the phone call, said message comprising an identifier of an endpoint of the group towards which redirecting the incoming phone call;
ii. at the server, sending a message to the called endpoint notifying said request to redirect the phone call.

In the method, i. advantageously further comprises informing, through a suitable user interface, a user of the monitoring endpoint of the phone call placed from the calling endpoint to the called endpoint.

The user interface may be, for example, a graphical user interface.

The identifier in i. may be the identifier of the monitoring endpoint sending the message or of another endpoint of the group. This allows redirecting the phone call to the monitoring endpoint making the request for redirection or to another endpoint of the group.

The method advantageously further comprises, at the monitoring endpoint, receiving from the server a message notifying that the calling endpoint has been requested to redirect the incoming phone call.

Advantageously, before executing i) and ii), the method comprises, at the monitoring endpoint, sending a message to the server for setting up a subscription to receive information about the endpoints associated with the group of endpoints.

In this case, the method advantageously further comprises, at the monitoring endpoint, receiving from the server a message indicating that the request of subscription came to a successful result.

Advantageously, step i. is performed if the request of subscription came to a successful result.

Advantageously, step ii. is performed if the request of subscription came to a successful result.

Advantageously, before executing step ii., the method comprises receiving, at the server, a message from the called endpoint reporting about the incoming phone call from the calling endpoint to the called endpoint.

In a fourth aspect, the present invention relates to a server of a communication system comprising modules adapted to:
- a) receive a message from a called endpoint associated with a group of endpoints reporting about an incoming phone call from a calling endpoint to the called endpoint;
- b) identify said group of endpoints associated with the called endpoint based on said message;
- c) identify at least one monitoring endpoint associated with the group of endpoints identified in step b);
- d) send to the at least one monitoring endpoint identified in step c) a message notifying the incoming phone call from the calling endpoint to the called endpoint.

Typically said modules, are software and/or hardware modules.

According to an embodiment, the modules are also adapted to e) receive from one of the monitoring endpoints of the group a message requesting to redirect the incoming phone call, said message comprising an identifier of a monitoring endpoint of the group towards which redirecting the incoming phone call.

According to this embodiment, the modules are also adapted to e1) send to the called endpoint a message notifying the request to redirect the incoming phone call, said message comprising the identifier of the monitoring endpoint towards which redirecting the incoming phone call.

According to this embodiment, the modules are also adapted to e2) receive from the called endpoint a message reporting that the calling endpoint has been requested to redirect the incoming phone call.

According to this embodiment, the modules are also adapted to e3) send to the at least one monitoring endpoint a message notifying that the calling endpoint has been requested to redirect the incoming phone call.

Preferably, the modules are also adapted to receive from at least one of the endpoints of the group a message for setting up a subscription to receive information about the endpoints associated with the group.

Advantageously, said message is received before executing a) to d).

In this case, advantageously, the modules are also adapted to check whether said at least one of the endpoints of the group is authorized, according to a predetermined authorization policy, to set up said subscription.

Advantageously, the modules are adapted to perform step d) if the at least one monitoring endpoint has successfully set up said subscription.

Advantageously, the modules are adapted to perform step e1) if the called endpoint has successfully set up said subscription.

Advantageously, the modules are adapted to perform step e3) if the at least one monitoring endpoint has successfully set up said subscription.

According to a preferred embodiment of the invention, the modules are adapted to receive and send messages according to the session initiation protocol (SIP), the SIP extension for Specific Event Notification RFC3265 and the SIP extension for Event State Publication RFC3903.

As far as further features of this aspect of the invention are concerned, reference is made to what disclosed above with reference to the first aspect of the invention.

In a fifth aspect, the present invention relates to an endpoint associated with a group of endpoints at a server of a communication system, the endpoint comprising modules that, for an incoming phone call from a calling endpoint, are adapted to:
1) receive from the calling endpoint a request to establish said incoming phone call;
2) send a message to the server reporting about the incoming phone call from the calling endpoint.

Typically, the modules are also adapted to 3) inform the calling endpoint about the receipt of said request.

According to a preferred embodiment, the modules are also adapted to 4) send a message to the server for requesting to set up a subscription to receive information about the endpoints associated with the group of endpoints.

Typically, 4) is performed at the switching on of the endpoint (automatically or by a user request).

Advantageously, the modules are also adapted to 5) receive a message from the server notifying a request to redirect the incoming phone call to another endpoint of the group. Advantageously, step 5) is performed if the above mentioned request for subscription came to a successful result.

Advantageously, the modules are also adapted to 6) request the calling endpoint to redirect the incoming phone call towards said another endpoint of the group.

Advantageously, the modules are also adapted to 7) send to the server a message reporting that the calling endpoint has been requested to redirect the incoming phone call towards said another endpoint of the group.

Advantageously, the modules are also adapted to 8) receive from the server a message notifying that the incoming phone call has been successfully redirected to said another endpoint of the group.

Advantageously, for a phone call placed from the calling endpoint to another endpoint of the group, the modules are also adapted to 9) receive a message from the server notifying said phone call.

Advantageously, step 9) is performed if the above mentioned request for subscription came to a successful result.

Advantageously, the modules are also adapted to inform, through a suitable user interface, a user of the endpoint about said phone call placed from the calling endpoint to another endpoint of the group.

Advantageously, the modules are also adapted to 10) send a message to the server requesting to redirect the phone call, said message comprising an identifier of an endpoint of the group towards which redirecting the phone call.

The identifier in 10) may be the identifier of the endpoint sending the message or of another endpoint of the group. This allows redirecting the phone call to the endpoint making the request for redirection or to another endpoint of the group.

Advantageously, the modules are also adapted to 11) receive from the server a message notifying, that the calling endpoint has been requested to redirect the phone call.

According to a preferred embodiment of the invention, the modules are adapted to receive and send messages according to the session initiation protocol (SIP), the SIP extension for Specific Event Notification RFC3265 and the SIP extension for Event State Publication RFC3903.

As far as further features of this aspect of the invention are concerned, reference is made to what disclosed above with reference to the second and third aspect of the invention.

In a further aspect, the present invention relates to a communication system comprising
- a plurality of endpoints associated with predetermined groups of endpoints;
- a server adapted to store for each group of endpoints a list of the endpoints, among said plurality of endpoints, associated therewith; and
- a communication network adapted to allow the server and the plurality of endpoints to communicate with each other, wherein, for an incoming phone call from a calling endpoint, each endpoint of the plurality of endpoints comprises modules adapted to:
1) receive from the calling endpoint a request to establish the incoming phone call;
2) send a message to the server reporting about the incoming phone call from the calling endpoint;

and wherein the server comprises modules adapted to:
a) receive the message sent in 2);
b) identify, based on said received message, a group of endpoints associated with the endpoint sending the message in 2);
c) identify at least one monitoring endpoint associated with the group of endpoints identified in step b);
d) send to the at least one monitoring endpoint identified in step c) a message notifying the incoming phone call.

As far as further features of this aspect of the invention are concerned, reference is made to what disclosed above with reference to the other aspects of the invention.

As already mentioned above, according to the various aspect of the invention, messages are advantageously exchanged according to the session initiation protocol (SIP), the SIP extension for Specific Event Notification RFC3265 and the SIP extension for Event State Publication RFC3903.

In this case, the endpoints are advantageously SIP endpoints. That is, they are adapted to support use of SIP and extensions thereof.

As an example and not by way of limitation, an endpoint may include a phone (which may be a mobile phone, a fixed phone or another phone), a computer (which may be a laptop computer, a desktop computer, or other computer), a personal digital assistant (PDA), a fax machine, a set top box, or other similar device.

The endpoints and the server may communicate through suitable links that may include one or more computer buses, LANs, MANs, WANs, or portions of the Internet or any other appropriate wireline, wireless; or other links.

Endpoints may communicate with each other using packets of data. A packet may include one or more packets, cells, frames, or other units of data. Data may include one or more data components, metadata components, executable software components, or other components.

Endpoints may use one or more suitable communication protocols to communicate with each other. As an example and not by way of limitation, in particular embodiments, endpoints may each be identified by an Internet Protocol (IP) address and may communicate with each other using IP.

For example, endpoints may support Voice over IP (VoIP) or Voice over Packet (VoP).

In view of the above, the invention, in the various aspects thereof, enables a user of a group of endpoints to perform a remote monitoring and management of the endpoints of the group. In particular, it enables a user to be informed about incoming phone calls to any of the endpoints of the group and, preferably, to redirect, from any endpoint of the group, the incoming phone call to any other endpoint of the group.

The invention is particularly advantageous when a group of endpoints is associated with a same USER-A.

Indeed, according to the invention, USER-B wishing to call USER-A is given the possibility to call a specific endpoint (e.g., mobile phone, office phone or home phone) of USER-A, among the group of endpoints of USER-A, the invitation to establish the phone call arriving directly at said specific endpoint called by USER-B. Then, it is the specific called endpoint which notifies the server about the incoming phone call from USER-B and the server notifies the other endpoints of the group about said incoming call.

Each endpoint thus maintains its identity, even if associated with a respective group of endpoints. In this way, USER-A is given the possibility to know at which endpoint (e.g., mobile phone, office phone or home phone), among the group of endpoints, USER-B is trying to contact him and is released from the responsibility of spreading, besides the number of each of his endpoints, a further number (i.e., a directory number or address of the group) to all the acquaintances of his interest. Moreover, USER-B, wishing to call USER-A, is released from the responsibility to know and note down, besides the phone number of each endpoint of USER-A, also a directory number or address of the group associated with USER-A, and to remember, at the time of making the phone call, to dial the group of USER-A and not a specific endpoint thereof. Therefore, the good functioning of the service is no longer in the user's hands as in the services disclosed by EP 1 435 722 and WO 2005/109844.

The above mentioned disadvantages of the methods disclosed by these documents, wherein the invitation to establish a phone call to an endpoint of a group arrives at a central communication network unit and then the phone call is routed by this unit to all the endpoints of the group, are thus overcome.

Moreover, according to the invention, the server is advised about an incoming phone call from the called endpoint. Therefore, contrary to the methods disclosed by EP 1 435 722 and WO 2005/109844, the network is released from the onerous and complex task of monitoring all the phone calls, in order to identify those directed to the groups stored therein.

Furthermore, with respect to EP 1 435 722 and the above mentioned Remote Call Control method disclosed in the Internet draft by R. Mahy and C. Jennings, the invention allows reducing the number of sent messages. For example, in fact, each endpoint can set up a subscription to receive information about the other endpoints associated with the group by sending a subscribing message only to the server. This requires a maximum of n subscribing messages to be sent instead of the n*(n−1) required by EP 1 435 722 and the above mentioned Internet draft, wherein n is the number of endpoints of the group.

Additionally, the invention releases the user from the burden of configuring each endpoint of the group for enabling it to accept subscribing messages only from "authorized" endpoints and from using high performance devices, capable to act as server devices.

BRIEF DESCRIPTION OF THE DRAWINGS

The features and advantages of the present invention will be made apparent by the following detailed description of some exemplary embodiments thereof, provided merely by way of non-limitative examples, description that will be conducted by making reference to the attached drawings, wherein.

DETAILED DESCRIPTION OF THE INVENTION

Figure 1:
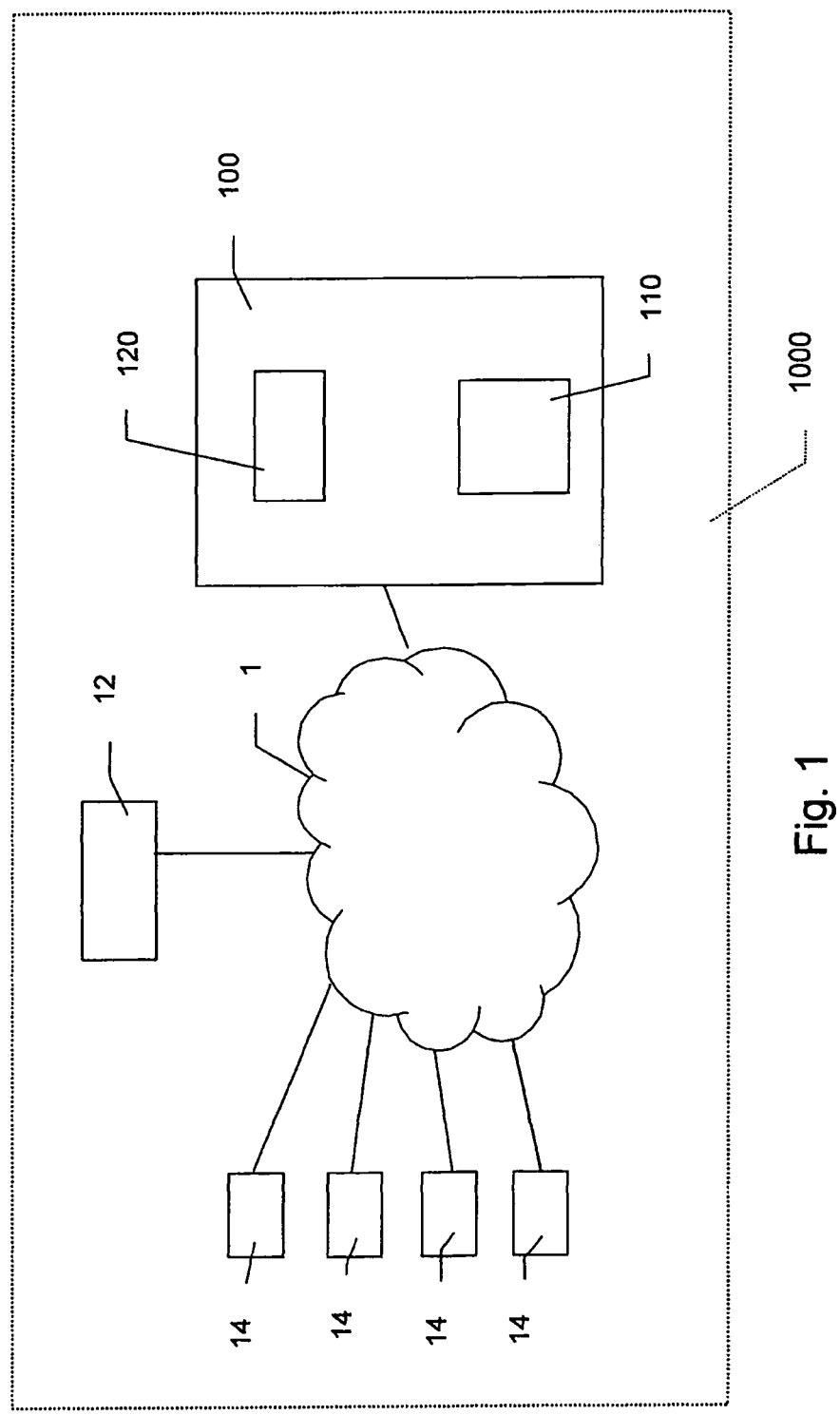
FIG. 1 schematically shows a communication system according to the invention.

FIG. 1 shows a communication system 1000 according to the invention, comprising a communication network 1, a server 100, and a plurality of endpoints 12, 14, adapted to perform a remote monitoring and managing of incoming phone calls to the endpoints 12 and/or 14, according to the invention.

Endpoints 12, 14 are adapted to communicate with each other and with the server 100 through the communication network 1.

As an example and not by way of limitation, the communication network 1 may comprise local area networks (LANs), wide area networks (WANs), metropolitan area networks (MANs). Links defined in the communication network 1 may comprise wireline links, or wireless links, or combination of wireline and wireless links. Typically, the communication network 1 supports packet-switched connections.

The server 100 comprises hardware modules, software modules and/or combinations thereof, adapted to implement the method according to an aspect of the invention.

As stated above, as an example and not by way of limitation, an endpoint may include a phone (which may be a mobile phone, a fixed phone, or another phone), a computer (which may be a laptop computer, a desktop computer, or other computer), a personal digital assistant (PDA), a set top box, a fax machine, or other similar device.

In the embodiment shown, endpoint 12 represents a calling endpoint while endpoints 14 represent a plurality of endpoints associated with a corresponding group. The server 100 is adapted to store in a suitable database 110 the list of endpoints 14 associated with said group. For example, the endpoints 14 are different phones (i.e. phones reachable through different directory numbers or identifiers) belonging to a same user.

The association of endpoints 14 with the respective group can be registered at the server 100 through any suitable procedure, for example through a web portal accessible from the Internet, or through a call center, or directly by one or more endpoints (for example through a profile manipulation protocol as, for example, XCAP: XML Configuration Access Protocol).

At the registration of the group, the server 100 may be adapted to perform predetermined checks to allow only authorized groups to be created. For example, it may authorize the registration of a group only if the endpoints associated therewith belong to a user subscribed to a predefined service.

Each group is typically identified by a group identifier and each endpoint is identified by an endpoint identifier. For example, the identifiers are SIP-URI (or TEL-URI) identifiers.

Endpoints 14 are advantageously adapted to run a dedicated application, which is generally referred to as user agent (UA), implementing a method according to the invention. The user agent may be implemented in hardware modules, software modules and/or combinations thereof.

For simplicity and not by way of limitation, in the remainder of the description reference is made to an exemplary embodiment of the invention wherein endpoints 12 and 14 are adapted to execute media sessions using SIP and extensions thereof, and messages between endpoints 12, 14 and server 100 are exchanged through SIP and extensions thereof.

In particular, a SUBSCRIBE SIP message is used by an endpoint 14 of the group to be entitled to receive information about the endpoints associated with the same group; a PUBLISH message is used by an endpoint 14 of the group to report the server about a change of state thereof; and a NOTIFY message is used by the server to notify endpoints 14 of the group about the change of state of an endpoint of the same group.

The body of said SIP messages can, for example, be in XML format.

Figure 5:
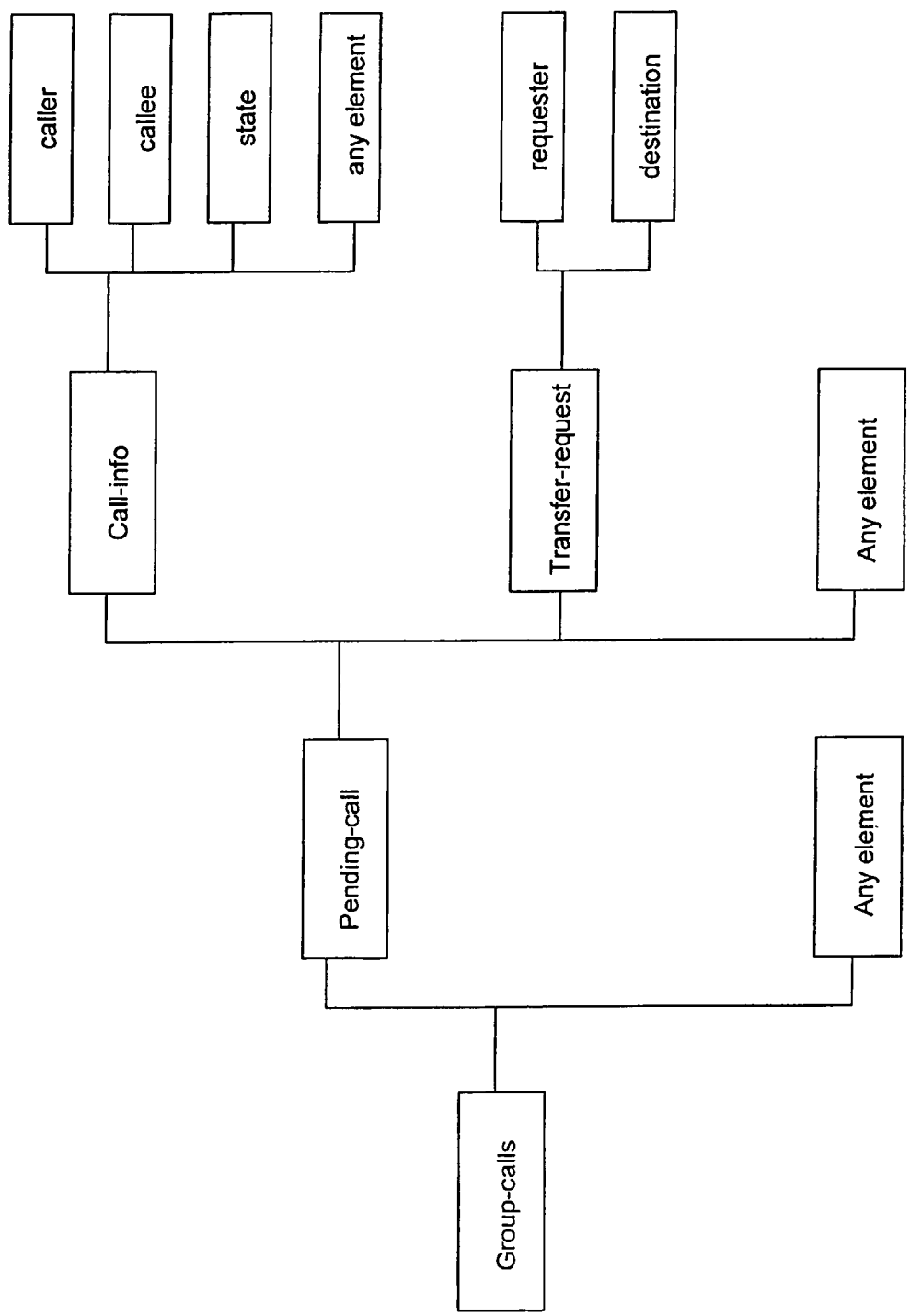
FIG. 5 shows an exemplary XML (eXtendible Markup Language) structure defining elements which can be used in an XML document related to a group of endpoints to implement the invention.

FIG. 5 shows an exemplary hierarchical structure defining elements which can be used in an XML document related to a group of endpoints to implement the invention. The XML document is stored at the server 100 (shown in FIG. 1 with block 120), and the messages exchanged between the endpoints 12, 14 and the server 100 in the shown framework of the invention comply with such structure.

In particular, according to the exemplary XML structure shown in FIG. 5, a "group-calls" root element is associated to a group of endpoints. The "group-calls" element is adapted to store information related to the pending calls received and notified from the endpoints of the group. Typically, such information at least includes an identifier associated with each pending call.

Information related to each pending call (the number of managed pending calls can vary from 0 to any number) is stored in a "pending-call" element. In particular, in the structure shown in FIG. 5, such information is organized in two sub-elements "call-info" and "transfer-request".

The element "call-info" comprises information related to identification of the "caller", identification of the "callee" and the "state" of the current pending call. Predefined values may be set for the "state of the call", e.g. "Ringing", "Rejected", "Accepted", etc.

The element "transfer-request" comprises information about a call transfer request asked by an endpoint of the group for the current pending call. It comprises identification of the "requester" of the transfer request and the "destination" of the transfer request, i.e. of the endpoint to which the current call should be redirected. The "caller", the "callee", the "requester" and the "destination" can be any URI identifier.

In FIG. 5 the elements labelled as "Any Element" correspond to "wildcard" elements, provided for possible insertion of further information at the different hierarchical levels.

Typically, the messages will comprise each a body and SIP headers, comprising a TO header (i.e. the identifier of the recipient of the message) and a FROM header (i.e. the identifier of the sender of the message).

For a SUBSCRIBE message sent to the server, the TO header can, for example, comprise the identifier of the group towards which the endpoint wants to set up a subscription, while the FROM header typically comprises the identifier of the endpoint sending the message.

For a PUBLISH message sent to the server, the TO header can, for example, comprise the identifier of the group to which the endpoint wants to report about a change of its state, while the FROM header typically comprises the identifier of the endpoint sending the message.

As a same endpoint may be associated with different groups of endpoints, the indication in the TO header of the group identifier, advantageously enable the server to identify, among said different group of endpoints, the group the SUBSCRIBE and PUBLISH messages are addressed to. Typically, when an endpoint belongs to more than one group, it will send one PUBLISH and one SUBSCRIBE message for each group.

For a NOTIFY message sent from the server, the TO header can, for example, comprise the identifier of the endpoint to which the message is addressed, while the FROM header may typically comprises the identifier of the group for which the server is sending the message.

For example, the main headers of a PUBLISH message sent by an endpoint identified as 335123456@telecomitalia.it, destined to the group identified as "mygroup" in the framework of a service named "Ring Everywhere", may be the following:
PUBLISH sip:mygroup@telecomitalia.it SIP/2.0
Event: ring-everywhere
From: sip:335123456@telecomitalia.it;
To: sip:mygroup@telecomitalia.it
Content-Type: application/ring-everywhere+xml According to a preferred embodiment of the invention, at the switching on, each endpoint 14 is adapted to send (automatically or by a user request) a SUBSCRIBE message to the server 100, for setting up a subscription to receive information about the endpoints 14 of the group.

When receiving a SUBSCRIBE message from an endpoint 14, server 100 is adapted to identify the group associated with said endpoint, to check whether said endpoint is entitled, according to a predetermined authorization policy, to set up the subscription to said group and to inform the endpoint about the result of the check.

The server 100 can, for example, identify the group to which the SUBSCRIBE request is related by retrieving the group identifier from the TO header of the SUBSCRIBE message or, if not present in the TO header, in the server database 110.

Once successfully subscribed to the respective group, endpoints 14 are adapted to be informed, through NOTIFY messages from the server 100, about any change of state of the endpoints of the group.

Figure 2:
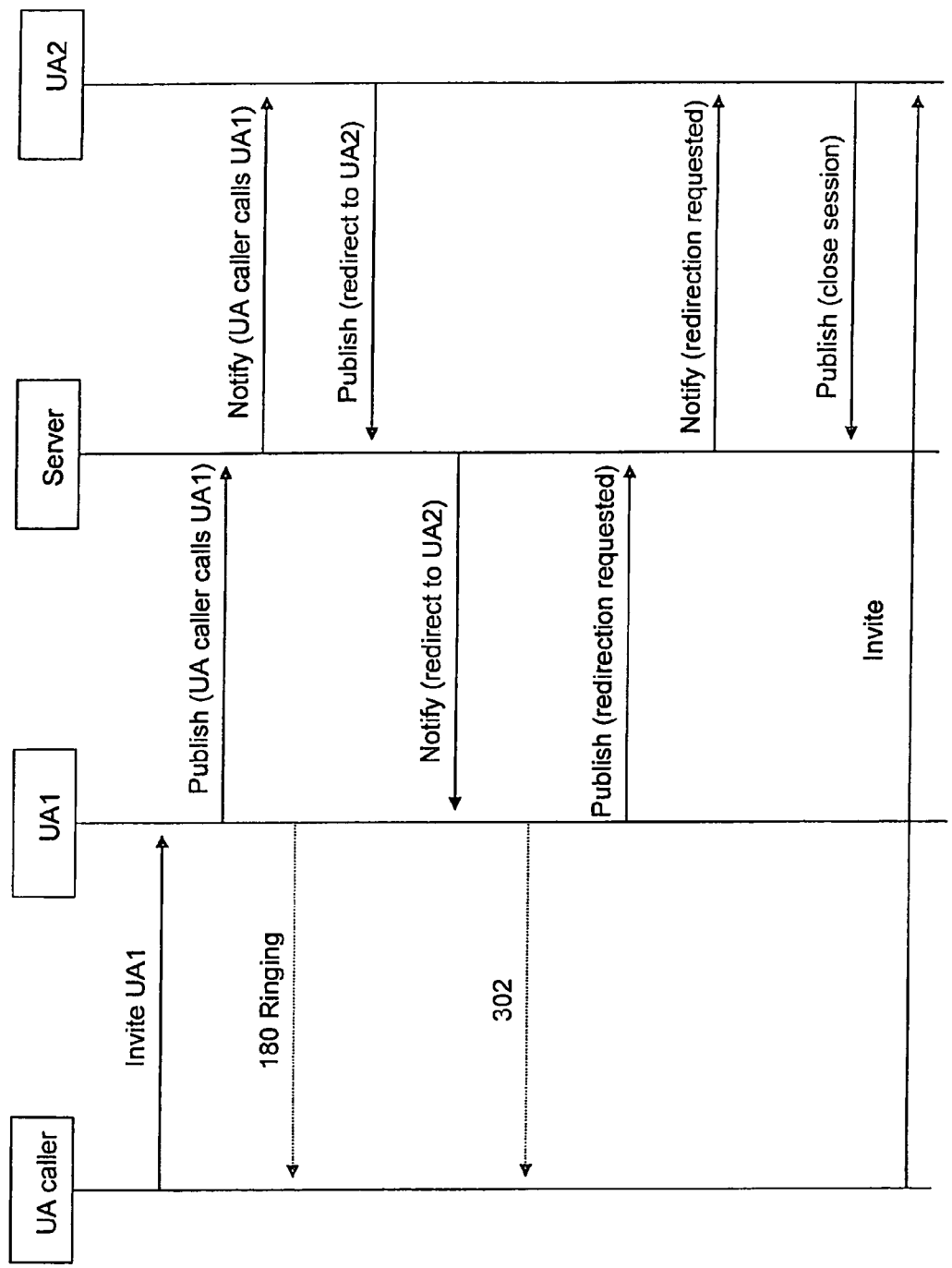
FIG. 2 schematically shows a message flow exemplifying an embodiment of the invention.
Figure 3:
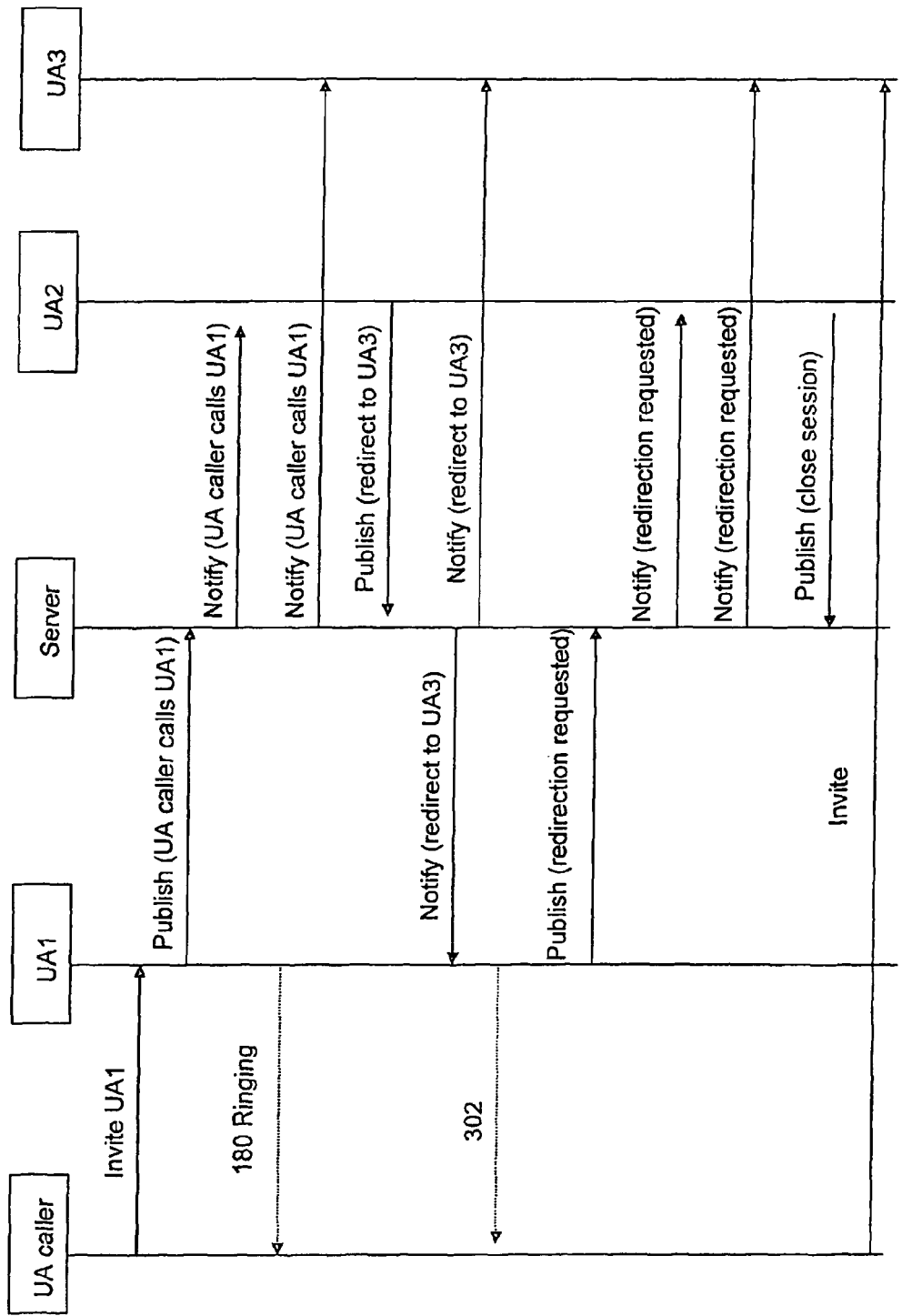
FIG. 3 schematically shows a message flow exemplifying another embodiment of the invention.

FIGS. 2 and 3 schematically show two message flows exemplifying two embodiments of the invention according to two different scenarios.

In these two embodiments, a number of endpoints is associated with a group. It is assumed that all the endpoints of the group have successfully set up a subscription to the group.

In FIG. 2, a called endpoint (UA1) receives an invitation to establish a phone call from a calling endpoint (UA caller). The called endpoint (UA1) is associated with a group comprising UA1 and a monitoring endpoint (UA2).

As shown in FIG. 2, when UA1 receives the invitation to establish a phone call from UA caller, it sends a 180 SIP message (ringing) to UA caller and a PUBLISH message to the server, reporting about the incoming phone call from UA caller to UA1.

The server receives the PUBLISH message from UA1, identifies the group of endpoints which UA1 is associated with (e.g., by retrieving it from the TO header of the PUBLISH message), retrieves in the server database 110 the other endpoint(s) associated with the group which has successfully set up a subscription (UA2, in the example shown in FIG. 2), and sends a NOTIFY message to UA2, (and typically also to UA1) comprising a body notifying the incoming phone call from UA caller to UA1.

It is noted that the server is typically configured so as to send any NOTIFY message to all endpoints which successfully have set up a subscription to the group. However, as in the message flows depicted in FIGS. 2 and 3, the server is preferably configured so that NOTIFY messages of no interest for an endpoint are not sent thereto (for example those NOTIFY messages which have been generated from a PUBLISH message sent by the same endpoint).

In the embodiment shown, it is assumed that the user of UA2, which is monitoring the call, wants to redirect the call towards UA2. Thus, after having received the NOTIFY message at UA2, the user commands (e.g. through a graphical user interface shown by UA2) the redirection of the call to UA2. UA2 thus sends a PUBLISH message to the server, comprising a body requesting to redirect the call from UA caller to UA2.

The server receives the PUBLISH message from UA2, identifies the group of endpoints which UA2 is associated with (e.g., by retrieving it from the TO header of the PUBLISH message), retrieves in the server database 110 the other endpoint(s) associated with the group which has successfully set up a subscription (UA1, in the shown example), and sends a NOTIFY message to UA1 (and typically also to UA2), comprising a body notifying the request made by UA2 to redirect the incoming phone call from UA caller to UA2.

Responsive to the received redirection NOTIFY message, UA1 replies to the INVITE message sent by UA caller with a redirection request (e.g., through a 302 MOVED TEMPORARILY SIP message), in order to enable UA caller to redirect the phone call to UA2. Furthermore, UA1 sends a PUBLISH message to the server, comprising a body reporting that UA caller has been requested to redirect the phone call to UA2.

The server receives the PUBLISH message from UA1 identifies the group of endpoints which UA1 is associated with, retrieves in the server database 110 the other endpoint(s) associated with the group which has successfully set up a subscription (UA2, in the shown example), and sends a NOTIFY message to UA2 (and typically also to UA1), comprising a body notifying that UA caller has been requested to redirect the phone call to UA2.

UA2 receives the NOTIFY message from the server and preferably sends a PUBLISH message to the server to close the session relating to the redirection of the pending call.

UA caller then invites UA2 to establish the phone call.

Even if not shown, when UA2 receives the invitation to establish the phone call from UA caller, it will send a 180 SIP message (ringing) to UA caller and a PUBLISH message to the server, reporting about the incoming phone call from UA caller to UA2.

The server will receive the PUBLISH message from UA2, will identify the group of endpoints which UA2 is associated with (e.g., by retrieving it from the TO header of the PUBLISH message), will retrieve in the server database 110 the other endpoint(s) associated with the group which has successfully set up a subscription (UA1, in the shown example), and will send a NOTIFY message to UA1 notifying the incoming phone call from UA caller to UA2.

At this time, when UA2 accepts (or rejects) the phone call from UA caller the procedure ends, or—if a further redirection from another endpoint of the group is requested—the procedure is repeated in an analogous way.

An example of the body of the PUBLISH message sent by UA1 (ua1@example.net) to the server in the framework of the service named "Ring Everywhere", reporting about the incoming phone call (having an identifier Call-ID ddmn39834729) from UA caller (uacaller@example.net), may be the following, when written in XML format according to the structure of FIG. 5:

```xml
<?xml version="1.0" encoding="UTF-8"?>
<group-calls
    xmlns="urn:telecomitalia:params:xml:ns:ring-every-where">
    <pending-call call-id="ddmn39834729">
        <call-info>
            <caller>sip:uacaller@example.net</caller>
            <callee>sip:ua1@example.net</callee>
            <state>ringing</state>
        </call-info>
    </pending-call>
</group-calls>
```

An example of the body of the PUBLISH message sent by UA2 (ua2@example.net) to the server, requesting to redirect the call from UA caller to UA2, may be the following, when written in XML format according to the scheme of FIG. 5:

```xml
<?xml version="1.0" encoding="UTF-8"?>
<group-calls
    xmlns="urn:telecomitalia:params:xml:ns:ring-every-where">
    <pending-call call-id="ddmn39834729">
        <transfer-request>
            <requester>sip:ua2@example.net</requester>
            <destination>sip:ua2@example.net</destination>
        </transfer-request>
    </pending-call>
</group-calls>
```

An example of the body of the NOTIFY message sent by the server to UA1, notifying the request to redirect the call from UA caller to UA2, may be the following, when written in XML format according to the scheme of FIG. 5:

```xml
<?xml version="1.0" encoding="UTF-8"?>
<group-calls
    xmlns="urn:telecomitalia:params:xml:ns:ring-every-where">
    <pending-call call-id="ddmn39834729">
        <call-info>
            <caller>sip:uacaller@example.net</caller>
            <callee>sip:ua1@example.net</callee>
            <state>ringing</state>
        </call-info>
        <transfer-request>
            <requester>sip:ua2@example.net</requester>
            <destination>sip:ua2@example.net</destination>
        </transfer-request>
    </pending-call>
</group-calls>
```

As to the scenario shown in FIG. 3, a called endpoint (UA1) receives an invitation to establish a phone call from a calling endpoint (UA caller). The called endpoint (UA1) is associated with a group comprising UA1 and two monitoring endpoints (UA2 and UA3).

When UA1 receives the invitation to establish a phone call from UA caller, it sends a 180 SIP message (ringing) to UA caller and a PUBLISH message to the server, comprising a body reporting about the incoming phone call from UA caller to UA1.

The server receives the PUBLISH message from UA1, identifies the group of endpoints which UA1 is associated with (e.g., by retrieving it from the TO header of the PUBLISH message), retrieves in the server database 110 the other endpoints associated with the group which has successfully set up a subscription (UA2 and UA3, in the shown example), and sends a NOTIFY message to UA2 and UA3 (and, typically also to UA1), comprising a body notifying the incoming phone call from UA caller to UA1.

In the embodiment shown it is assumed that the user of UA2, which is monitoring the call, wants to redirect the call towards UA3. Thus, after having received the NOTIFY message at UA2, the user commands (e.g. through a graphical user interface shown by UA2) the redirection of the call to UA3. UA2 thus sends a PUBLISH message to the server, comprising a body requesting to redirect the call from UA caller to UA3.

The server receives the PUBLISH message from UA2, identifies the group of endpoints which UA2 is associated with (e.g., by retrieving it from the TO header of the PUBLISH message), retrieves in the server database 110 the other endpoints associated with the group which has successfully set up a subscription (UA1 and UA3, in the example), and sends a NOTIFY message to UA1 and UA3 (and, typically to UA2), comprising a body notifying the request made by UA2 to redirect the incoming phone call from UA caller to UA3.

Responsive to the received redirection NOTIFY message, UA1 replies to the INVITE message sent by UA caller with a redirection request (e.g., through a 302 MOVED TEMPORARILY SIP message), in order to enable UA caller to redirect the phone call to UA3. Furthermore, UA1 sends a PUBLISH message to the server, comprising a body reporting that UA caller has been requested to redirect the phone call to UA3.

The server receives the PUBLISH message from UA1, identifies the group of endpoints which UA1 is associated with, retrieves in the server database 110 the other endpoints associated with the group which has successfully set up a subscription (UA1 and UA3, in the example), and send a NOTIFY message to UA2 and UA3 (and typically also to UA1), comprising a body notifying that UA caller has been requested to redirect the phone call to UA3.

UA2 receives the NOTIFY message from the server and preferably sends a PUBLISH message to the server to close the session relating to the redirection of the pending call.

UA caller then invites UA3 to establish the phone call.

Even if not shown, when UA3 receives the invitation to establish the phone call from UA caller, it will send a 180 SIP message (ringing) to UA caller and a PUBLISH message to the server, reporting about the incoming phone call from UA caller to UA3.

The server will receive the PUBLISH message from UA3, will identify the group of endpoints which UA3 is associated with (e.g., by retrieving it from the TO header of the PUBLISH message), will retrieve in the server database 110 the other endpoints associated with the group which has successfully set up a subscription (UA1 and UA3, in the example), and will send a NOTIFY message to UA1 and UA2 notifying the incoming phone call from UA caller to UA3.

At this time, when UA3 accepts (or rejects) the phone call from UA caller the procedure ends, or—if a further redirection from another endpoint of the group is requested—the procedure is repeated in an analogous way.

In general, even if not shown, the Applicant notes that when there is more than one monitoring endpoint (e.g., UA2 and UA3) associated with the same group which requests to redirect a phone call placed to a called endpoint (e.g. to UA1) of the group, the server may be configured to tag the requests with a timestamp so that the redirection request arrived first is rendered identifiable to the called endpoint and the latter is enabled to perform the appropriate choice of the endpoint to which the call should be redirected (e.g., the one identified in the redirection request first arrived).

Moreover, even if not shown, the Applicant notes that, in general, when none of the monitoring endpoints (e.g., UA2 and UA3) of the group requests to redirect a phone call placed to a called device (e.g. to UA1) of the group, the procedure will end when the called device accepts or rejects the incoming phone call or when the incoming phone call is unanswered for a predetermined time period. Indeed, the called device will send a PUBLISH message to the server reporting that the incoming phone call was accepted, rejected or unanswered and the server will notify the monitoring endpoints of the group about that.

The Applicant also notes that, in general, in the above description made with reference to FIGS. 2 and 3, two roles can be identified for the endpoints: a "publisher role" and a "monitoring role".

The publisher role refers to an endpoint which is adapted to report, through the server, the other endpoints of the group about any change of its state. The monitoring role refers to an endpoint which is adapted to receive information about any change of state of the other endpoints associated with the same group.

Accordingly, in the publisher role, an endpoint of a group is adapted to allow the other endpoints of the group to monitor incoming phone calls placed to itself, while in the monitoring role, an endpoint of a group is adapted to monitor phone calls placed to other endpoints of the group and, optionally, to request to redirect said phone calls towards itself or another endpoint of the group.

According to the invention, an endpoint may be adapted to act in one role only or both.

For example, when acting in the publisher role only, an endpoint is not adapted to receive information about any change of state of the other endpoints associated with the same group. That is, it is not entitled to monitor phone calls placed to other endpoints of the group and, thus, to request to redirect said phone calls. Moreover, it is not entitled to receive from the other endpoints of the group a request to redirect incoming phone calls placed to itself to an endpoint of the group. However, the other endpoints, being informed about said incoming phone call, have the possibility to get in touch with the calling endpoint by themselves.

For example, an endpoint can be entitled to act in the publisher role only by abstention from setting up a subscription to the respective group or through a suitable configuration of the same.

When acting in the monitoring role only, an endpoint is not adapted to inform the other endpoints of the group about incoming phone calls placed to itself.

In view of the above description of the invention, the invention allows a user of a group of endpoints to perform a remote monitoring and management of the endpoints of the group. In particular, preferred embodiments of the invention enable a user to be informed about phone calls placed to any endpoints of the group and, preferably, to redirect, from any endpoint of the group, the incoming phone call to any endpoint of the group.

Figure 4:
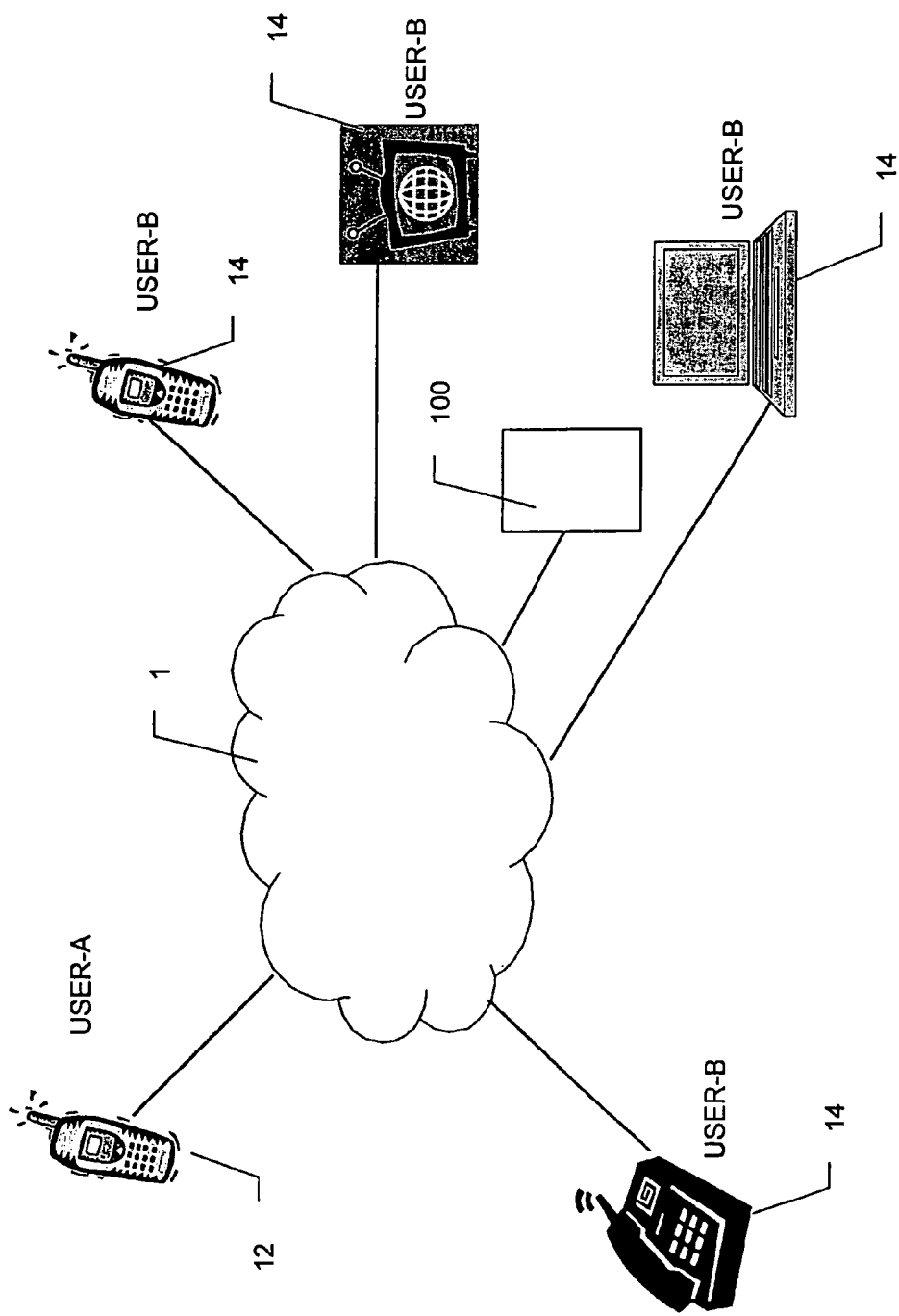
FIG. 4 schematically shows an exemplary implementation scenario of the invention.

For example, as shown in FIG. 4, User-B having four endpoints (e.g., home fixed phone, cellular phone, TV with set-top-box, personal computer PC at his office) associated with a predetermined group, has the possibility to be advised of a phone call placed from USER-A to the home phone at the other endpoints of the group (in the example, at the cellular phone, TV and PC). According to a preferred embodiment of the invention, USER-B has also the possibility to request to redirect the phone call to another endpoint of the group. For example, if USER-B is in the office and it has the cellular phone to hand, being advised through a user interface about the phone call placed from user-A to his home telephone, USER-B has the possibility to request, from the cellular phone, for a redirection of the phone call to the same cellular phone or to another endpoint (e.g., to the PC).

Moreover, USER-B which, for example, forgets his cellular phone at home and is in USER-C's company, has the possibility to request USER-C to temporarily associate his cellular phone with the group of endpoints of USER-C so that USER-B may be notified—through said group of endpoints of USER-C—about any incoming phone calls towards his cellular phone and, optionally, to redirect said phone calls to an endpoint (e.g. the cellular phone) of the group of USER-C.

The invention claimed is:

1. A method for managing, in a server of a communication system, an incoming phone call from a calling endpoint to a called endpoint device associated with a group of endpoints associated to a same user, said group comprising the called endpoint device and at least one monitoring endpoint, the called endpoint device and monitoring endpoint being implemented by either a software or hardware application, comprising:
   a) receiving a message from the called endpoint device reporting about the incoming phone call from the calling endpoint to the called endpoint device;
   b) identifying said group of endpoints associated with the called endpoint device based on said message;
   c) identifying the at least one monitoring endpoint associated with the group of endpoints identified in step b); and
   d) sending to the at least one monitoring endpoint identified in step c) a message notifying the incoming phone call from the calling endpoint to the called endpoint device,
   wherein the called endpoint device is adapted to report, through the server, the incoming phone call to the at least one monitoring endpoint, and
   wherein the monitoring endpoint is adapted to monitor the incoming phone call placed to the called endpoint device by a request to redirect said incoming phone call to either the monitoring endpoint or to another endpoint of the group.

2. The method according to claim 1, further comprising:
   e) receiving from one of the monitoring endpoints of the group a message requesting to redirect the incoming phone call, said message comprising an identifier of a monitoring endpoint of the group toward which the incoming phone call is redirected.

3. The method according to claim 2, further comprising:
   e1) sending to the called endpoint device a message notifying of the request to redirect the incoming phone call, said message comprising the identifier of the monitoring endpoint toward which the incoming phone call is redirected.

4. The method according to claim 3, further comprising:
   e2) receiving from the called endpoint device a message reporting that the calling endpoint has been requested to redirect the incoming phone call.

5. The method according to claim 4, further comprising:
   e3) sending to the at least one monitoring endpoint a message notifying that the calling endpoint has been requested to redirect the incoming phone call.

6. The method according to claim 1, wherein the received and sent messages are session initiation protocol messages.

7. A method for managing, in a server of a communication system and in a monitoring endpoint, a phone call placed from a calling endpoint to a called endpoint device, the called endpoint device and the monitoring endpoint being associated with a group of endpoints associated to a same user, the association being established at the server, comprising:

i. at the monitoring endpoint, receiving a message from the called endpoint device through the server notifying of the phone call placed from the calling endpoint to the called endpoint device; and sending a message to the server requesting redirection of the phone call, said message comprising an identifier of an endpoint of the group toward which the incoming phone call is redirected; and
ii. at the server, sending a message to the called endpoint device notifying of said request to redirect the phone call, wherein the called endpoint device is adapted to report, through the server, the incoming phone call to the at least one monitoring endpoint, and wherein the monitoring endpoint is adapted to monitor the incoming phone call placed to the called endpoint device by a request to redirect said incoming phone call to either the monitoring endpoint or to another endpoint of the group.

8. A server of a communication system comprising modules configured to manage an incoming phone call from a calling endpoint to a called endpoint device associated with a group of endpoints associated to a same user, said group comprising the called endpoint device and at least one monitoring endpoint, the called endpoint device and monitoring endpoint being implemented by either a software or hardware application, said modules capable of being adapted to:

a) receive a message from the called endpoint device reporting about the incoming phone call from the calling endpoint to the called endpoint device;
b) identify said group of endpoints associated with the called endpoint device based on said message;
c) identify the at least one monitoring endpoint associated with the group of endpoints identified in step b); and
d) send to the at least one monitoring endpoint identified in c), a message notifying the incoming phone call from the calling endpoint to the called endpoint device, wherein the called endpoint device is adapted to report, through a server, the incoming phone call to the at least one monitoring endpoint, and wherein the monitoring endpoint is adapted to monitor the incoming phone call placed to the called endpoint device by a request to redirect said incoming phone call to either the monitoring endpoint or to another endpoint of the group.

\* \* \* \* \*

UNITED STATES PATENT AND TRADEMARK OFFICE
CERTIFICATE OF CORRECTION

| | | |
|---|---|---|
| PATENT NO. | : 8,472,603 B2 | Page 1 of 1 |
| APPLICATION NO. | : 12/311072 | |
| DATED | : June 25, 2013 | |
| INVENTOR(S) | : Fusco et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this
Tenth Day of February, 2015

Michelle K. Lee
*Deputy Director of the United States Patent and Trademark Office*